(12) United States Patent
Malki et al.

(10) Patent No.: US 8,893,862 B2
(45) Date of Patent: Nov. 25, 2014

(54) BRAKE ADJUSTER MECHANISM

(75) Inventors: Refaat Malki, Bristol (GB); Martin Pors Taylor, Torfaen (GB)

(73) Assignee: Meritor Heavy Vehicle Braking Systems (UK) Limited, Monmouthshire (GB)

( * ) Notice: Subject to any disclaimer, the term of this patent is extended or adjusted under 35 U.S.C. 154(b) by 182 days.

(21) Appl. No.: 13/431,037

(22) Filed: Mar. 27, 2012

(65) Prior Publication Data

US 2013/0256076 A1 Oct. 3, 2013

(30) Foreign Application Priority Data

Mar. 29, 2011 (GB) .................................. 1105236.2

(51) Int. Cl.
*F16D 65/14* (2006.01)

(52) U.S. Cl.
USPC .................... 188/196 R; 188/196 D; 188/71.8

(58) Field of Classification Search
USPC .......... 188/196 R, 196 D, 196 V, 106 F, 71.8, 188/72.6, 72.7, 72.8, 73.1
See application file for complete search history.

(56) References Cited

U.S. PATENT DOCUMENTS

| | | | | |
|---|---|---|---|---|
| 4,180,146 | A | * | 12/1979 | Airheart ........................ 188/71.8 |
| 4,454,933 | A | | 6/1984 | Hunnicutt et al. |
| 5,000,294 | A | * | 3/1991 | Hunnicutt et al. ........... 188/71.9 |
| 5,038,895 | A | * | 8/1991 | Evans .......................... 188/72.7 |
| 2007/0209890 | A1 | | 9/2007 | Iraschko |
| 2009/0260930 | A1 | | 10/2009 | Lotz |
| 2011/0155518 | A1 | | 6/2011 | Iraschko |
| 2011/0203882 | A1 | | 8/2011 | Iraschko |
| 2011/0203883 | A1 | | 8/2011 | Iraschko et al. |
| 2011/0203884 | A1 | | 8/2011 | Iraschko et al. |
| 2011/0203885 | A1 | | 8/2011 | Iraschko et al. |
| 2011/0203886 | A1 | | 8/2011 | Iraschko et al. |

FOREIGN PATENT DOCUMENTS

| | | |
|---|---|---|
| EP | 1064478 | 2/2003 |
| EP | 0937210 | 9/2003 |
| EP | 1066478 | 5/2004 |
| EP | 0963520 | 6/2004 |
| WO | 98/21497 | 5/1998 |
| WO | 98/38437 | 9/1998 |
| WO | 99/49232 | 9/1999 |
| WO | 99/49242 | 9/1999 |
| WO | 2011/006928 | 1/2011 |

OTHER PUBLICATIONS

United Kingdom Search Report for Application No. GB1105236.2 dated Jul. 22, 2011.

* cited by examiner

*Primary Examiner* — Pamela Rodriguez
(74) *Attorney, Agent, or Firm* — Brooks Kushman P.C.

(57) ABSTRACT

A brake adjuster mechanism including an input shaft, a one-way clutch, and a torque limiting clutch. The input shaft is coupled to an input element of the torque limiting clutch. The one-way clutch is coupled to the torque limiting clutch. The torque limiting clutch further includes an output element and a coupling portion, with the coupling portion including a projection for selectively rotationally coupling the input element and the output element. One of the input element and output element includes a first recess circumferentially spaced from a second recess. The projection is selectively biased into the first recess and the second recess. The input element is frictionally coupled by a friction device to the output element to resist rotation of the input element relative to the output element.

14 Claims, 7 Drawing Sheets

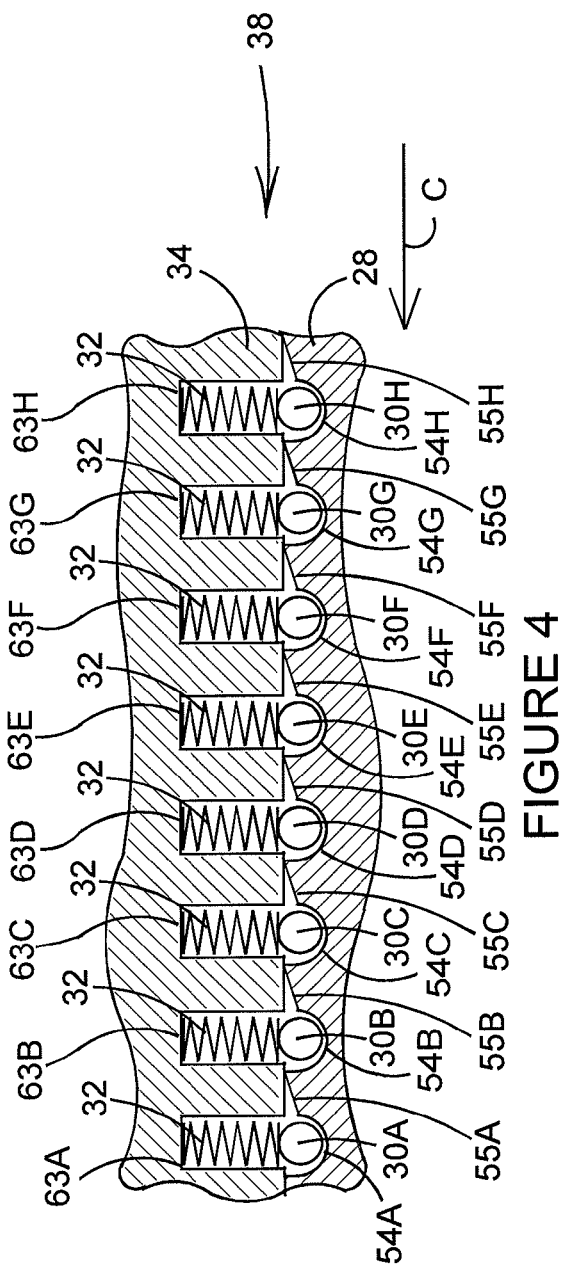
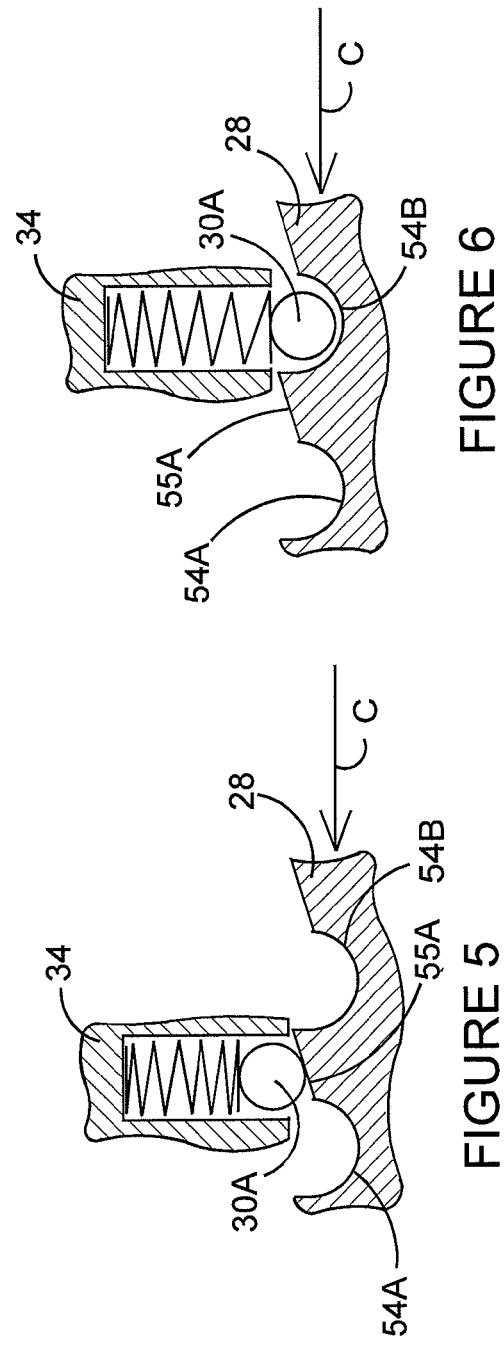
FIGURE 4
FIGURE 5
FIGURE 6

BRAKE ADJUSTER MECHANISM

RELATED APPLICATION

This application claims priority to United Kingdom Application No. GB 1105236.2 filed Mar. 29, 2012.

TECHNICAL FIELD

The present invention relates to a brake adjuster mechanism, in particular a brake adjuster mechanism used to compensate for wear of a brake pad or a brake shoe.

BACKGROUND OF THE INVENTION

EP0937210 shows a brake adjuster mechanism for a disc brake. The brake adjuster mechanism includes a torque limiting clutch and a one-way clutch. When the brake is applied a gear segment rotates one part of a torque limiting clutch. At relatively low torque (i.e. at torques below the limiting torque of the clutch) rotation of the first part will cause rotation of the second part which in turn drives an adjuster gear of the brake via the one-way clutch. The adjuster gear adjusts the brake mechanism so as to compensate for wear of the brake pads. If no wear adjustment is required, the limiting torque will be exceeded and ball elements of the torque limiting clutch will be forced out of associated pockets thereby enabling the first part to rotate relative to the second part when the limiting torque is exceeded. Upon release of the brake the first part is rotated backwards and the ball elements returned to their original pockets and the torque limiting clutch returns to its original position. The one way clutch ensures that the adjuster gear remains in its adjusted position. Thus, upon substantially every application of the brake the torque limiting clutch will exceed its torque limit and therefore the components of the adjuster mechanism will be subjected to a torque equivalent to the torque limit. This causes wear of the adjuster components.

EP0963520 shows an alternative arrangement whereby a gear segment drives a torque limiting clutch which in turn drives an adjuster gear via a one-way clutch. The components of this mechanism are subject to the limiting clutch torque upon substantially every application of the brake, which leads to wear.

Typically, when a brake disc is not being applied there will be a running clearance between each brake pad and the disc. For a heavy vehicle this running clearance is of the order of 0.5 mm between each pad and the disc, i.e. a total of the order of 1 mm from the brake assembly as a whole. The running clearance is determined by the backlash in the adjuster mechanism. The adjuster mechanism is therefore designed with a predetermined amount of backlash, equivalent to the required running clearance of the brake. As the components of the adjuster mechanism wear, then so the backlash in the adjuster mechanism increases which results in an increase in the running clearance of the brake. This is undesirable.

Thus, an improved form of brake adjuster is required which is subject to less wear.

SUMMARY OF THE INVENTION

In one exemplary embodiment, a brake adjuster mechanism includes: an input shaft, a one-way clutch, and a torque limiting clutch. The input shaft is coupled to an input element of the torque limiting clutch. The one-way clutch is coupled to the torque limiting clutch. The torque limiting clutch further includes an output element and a coupling portion, with the coupling portion including a projection for selectively rotationally coupling the input element and output element. One of the input element and output element includes a first recess circumferentially spaced from a second recess. The projection is selectively biased into the first recess and second recess. The input element is frictionally coupled by a friction device to the output element to resist rotation of the input element relative to the output element.

In one example, the one way clutch includes a wrap spring.

In one example, the one way clutch is a sprag clutch.

In one example, the coupling portion includes a ball.

In one example, a portion of the ball defines the projection.

In one example, the ball is partially received in a pocket of the output element.

In one example, the pocket includes a resilient member for selectively biasing the projection into the first recess and the second recess.

In one example, the brake adjuster includes a bias member for selectively biasing the projection into the first recess and the second recess, said bias member acting to generate a friction force in the friction device.

In one example, the friction device includes a friction element operably clamped between the input element and the output element.

In one example, the input shaft is coupled to the input element of the torque limiting clutch via the one way clutch.

In one example, the input element forms part of a one way clutch.

In one example, the input element is engaged by a wrap spring of the one-way clutch.

In one example, the input shaft is coupled to the one way clutch via the torque limiting clutch.

In one example, the input element forms part of the input shaft.

In one example, the output element is engaged by a wrap spring of the one way clutch.

In one example, the first recess is circumferentially spaced from the second recess by a land angled downwardly towards the second recess.

In one example, the first recess is circumferentially spaced from the second recess by a land angled upwardly towards the second recess.

In one example, the one way clutch defines a clutching mode of operation and a declutching mode of operation and further defines a declutching torque when operating in the declutching mode of operation and the declutching torque as seen by the torque limiting clutch is less than the torque across the torque limiting clutch generated by the friction device.

In another exemplary embodiment, there is provided a method of operating a brake including a brake adjuster mechanism. The brake adjuster mechanism includes an input shaft, a one-way clutch, and a torque limiting clutch. The input shaft is coupled to an input element of the torque limiting clutch. The one-way clutch is coupled to the torque limiting clutch. The torque limiting clutch further includes an output element and a coupling portion, with the coupling portion including a projection for selectively rotationally coupling the input element and the output element. One of the input element and output element includes a first recess circumferentially spaced from a second recess. The projection is selectively biased into the first recess and the second recess. The brake adjuster mechanism includes a land between the first recess and second recess. The method includes the steps of positioning the projection in the first recess, then applying the brake to rotate the input element relative to the output element thereby removing the projection from the first recess and positioning the projection on the land, then releasing the brake while ensuring the projection remains on the land, and then applying the brake to rotate the input element relative to the output element thereby moving the projection from the land into the second recess.

In one example, the first recess is circumferentially spaced from the second recess by at least a circumferential width of the first recess.

In one example, the first recess is circumferentially spaced from the second recess by at least a circumferential width of the projection.

In one example, the input element is frictionally coupled by a friction device to the output element to restrict rotation of the input element relative to the output element.

In one example, the one way clutch defines a clutching mode of operation and a declutching mode of operation and further defines a declutching torque when operating in the declutching mode of operation, and the declutching torque as seen by the torque limiting clutch is less than the torque across the torque limiting clutch generated by the friction device.

In one example, the first recess is circumferentially spaced from the second recess by a land angled downwardly towards the second recess.

In another exemplary embodiment, the brake adjuster mechanism includes an input shaft, a one-way clutch, and a torque limiting clutch. The input shaft is coupled to an input element of the torque limiting clutch. The one-way clutch is coupled to the torque limiting clutch. The torque limiting clutch further includes an output element and a coupling portion, with the coupling portion including a projection for selectively rotationally coupling the input element and the output element. One of the input element and output element includes a first recess circumferentially spaced from a second recess, the projection being selectively biased into the first recess and the second recess, wherein the first recess is circumferentially spaced from the second recess by a land angled downwardly towards the second recess.

In one example, the one way clutch includes a wrap spring.

In one example, the input element is frictionally coupled by a friction device to the output element to resist rotation of the input element relative to the output element.

In one example, the one way clutch defines a clutching mode of operation and a declutching mode of operation and further defines a declutching torque when operating in the declutching mode of operation, and the declutching torque as seen by the torque limiting clutch is less than the torque across the torque limiting clutch generated by the friction device.

In another exemplary embodiment, a brake adjuster mechanism includes an input shaft, a one-way clutch, and a torque limiting clutch. The input shaft is coupled to an input element of the torque limiting clutch. The one-way clutch is coupled to the torque limiting clutch. The torque limiting clutch further includes an output element and a coupling portion, with the coupling portion including a projection for selectively rotationally coupling the input element and the output element. One of the input element and output element includes a first recess circumferentially spaced from a second recess, the projection being selectively biased into the first recess and the second recess, wherein the first recess is circumferentially spaced from the second recess by a land and wherein when the projection progresses from an end of the land proximate the first recess to an end of the land proximate the second recess the limiting torque of the torque limiting clutch decreases.

In one example, the one way clutch defines a clutching mode of operation and a declutching mode of operation and further defines a declutching torque when operating in the declutching mode of operation, and the declutching torque is less than the torque generated by the friction device.

BRIEF DESCRIPTION OF THE DRAWINGS

The invention will now be described, by way of example only, with reference to the accompanying drawings in which:

FIG. 4 is a developed view of part of FIG. 1 showing the components in a first position, FIG. 5 is a part view of FIG. 4 showing the components in a second position, FIG. 6 is a part view of FIG. 4 showing the components in a third position.

DETAILED DESCRIPTION

For background information relating to brakes the readers attention is drawn to EP1066478 and EP1064478. The brakes shown in these prior art documents are disc brakes having two brake pads, one being mounted on either side of a brake disc. The brake applies a clamp force to the brake pads thereby clamping the disc and slowing the associated vehicle. An actuator mechanism is used to apply the clamp force. As the brake pads wear, adjustment is required to move the brake pads progressively towards the brake disc to compensate for friction material wear. Adjuster mechanisms are shown in EP1066478 and EP1064478.

The present invention is directed towards a novel and inventive adjuster mechanism for use in a brake assembly, for example the present invention can be used in the brakes shown in EP1066478 and EP1064478.

With reference to FIGS. 1 to 7, and in overview, the brake assembly 10 of the present invention includes pistons (not shown) slideably mounted in bores 11 and 12. Pistons are adjustable in length to compensate for wear of the associated brake pad. Each piston has a piston gear (not shown) which engages an adjuster gear 14. Rotation of adjuster gear 14 rotates the piston gears resulting in lengthening of the effective length of the associated piston, thereby compensating for wear of the pad.

The adjuster mechanism 16 selectively rotates adjuster gear 14 as will be further described below.

Figure 3:
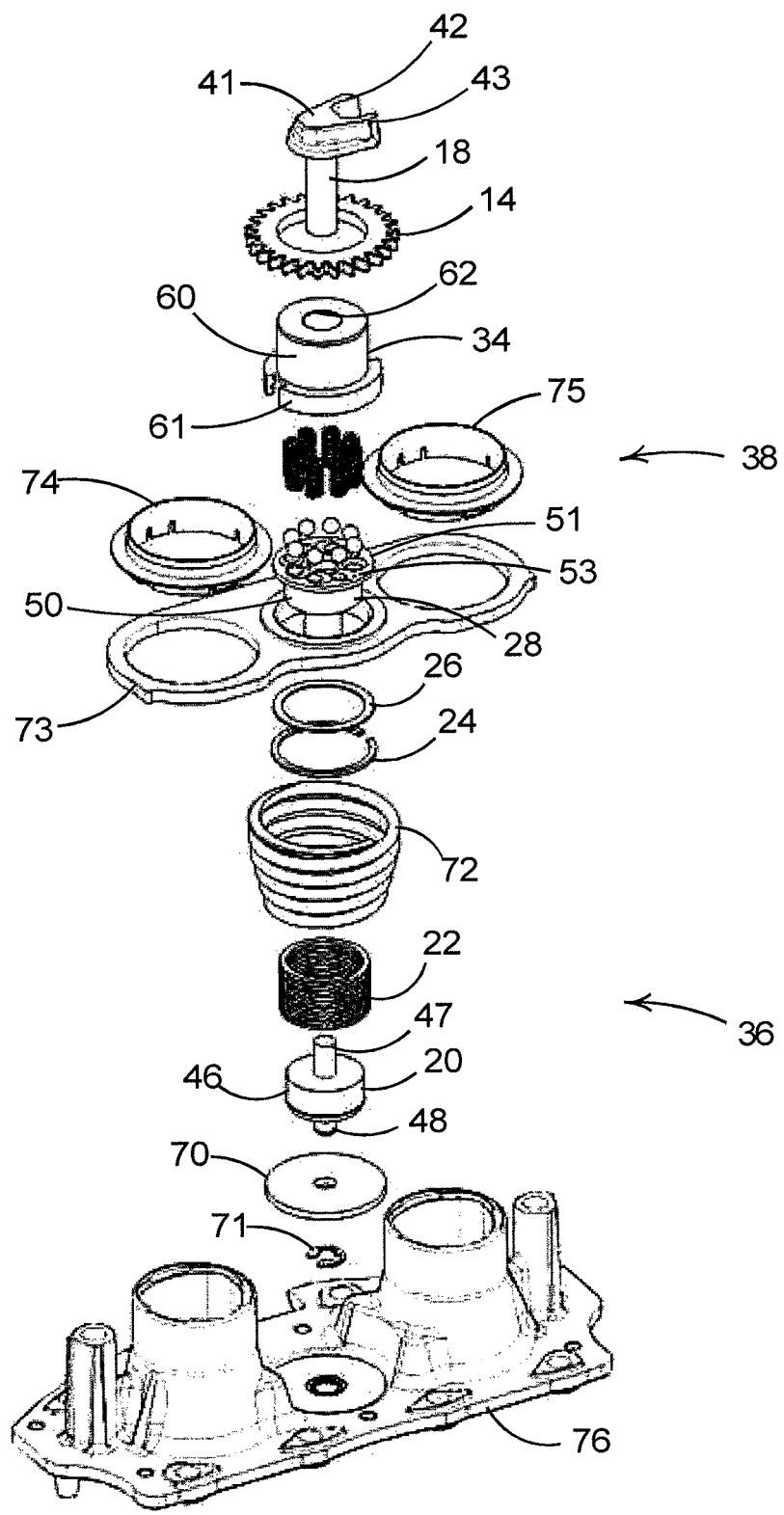
FIG. 3 is an exploded view of the unsectioned components of FIG. 1.

As shown in FIG. 3, the adjuster mechanism 16 includes input shaft 18, drum 20, wrap spring 22, circlip 24, friction washer 26, input element 28, and ball bearings 30A, 30B, 30C, 30D, 30E, 30F, 30G and 30H (FIG. 4). The adjuster mechanism 16 further includes eight springs 32 and an output element 34.

The drum 20, wrap spring 22, and input element 28 together form a one-way clutch 36. The input element 28, ball bearings 30A, 30B, 30C, 30D, 30E, 30F, 30G and 30H, eight springs 32, and output element 34 together form a torque limiting clutch 38.

Figure 2:
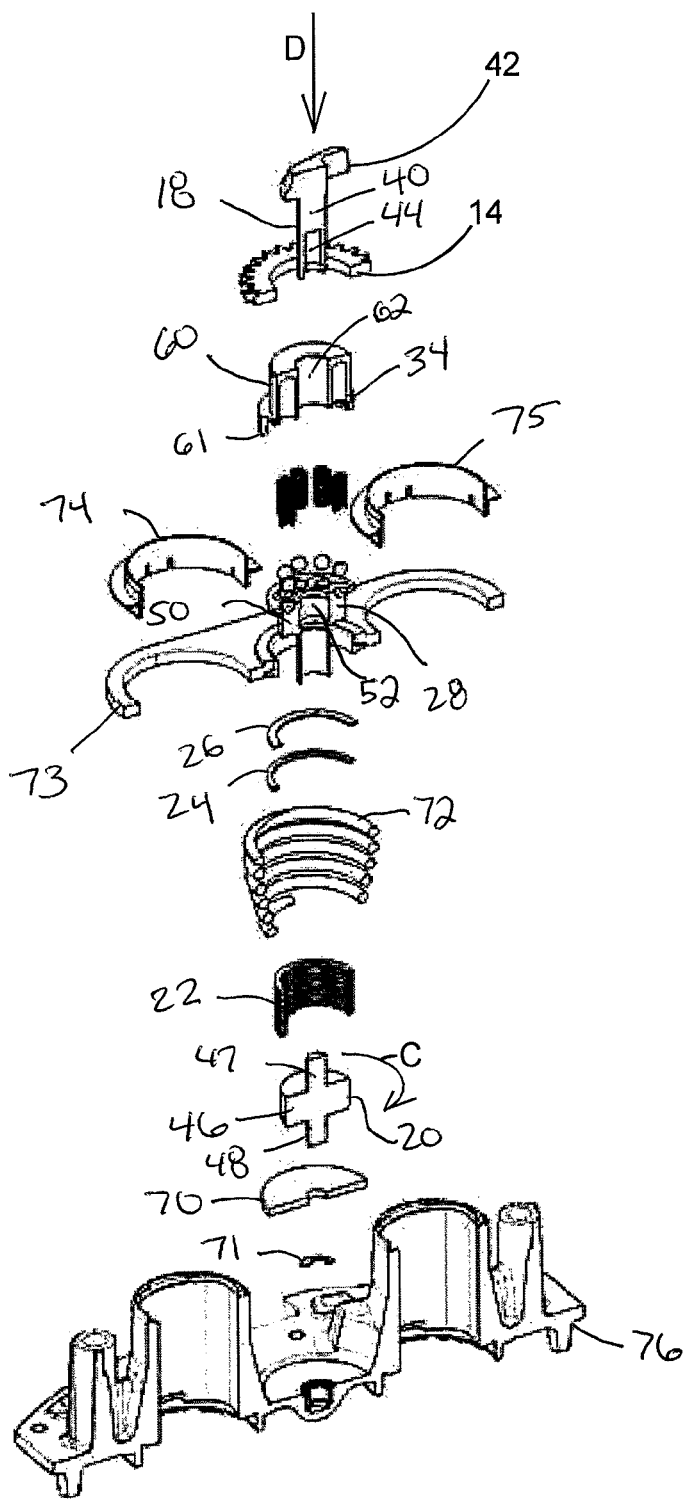
FIG. 2 is an exploded section view of FIG. 1.

Input shaft 18 includes a cylindrical shaft section 40 and a fork 41 having tines 42 and 43. The cylindrical shaft section includes a cylindrical recess 44 (FIG. 2).

The drum 20 has a cylindrical portion 46, a first spigot 47, and a second spigot 48.

The input element 28 has a cylindrical portion 50 at one end of which there is a rim 51. The cylindrical portion includes a central hole 52. In end face 53 there is a series of circumferentially spaced recesses 54A, 54B, 54C, 54D, 54E, 54F, 54G and 54H. Between adjacent recesses there is a series of circumferentially spaced lands 55A, 55B, 55C, 55D, 55E, 55F, 55G and 55H. In this case the circumferential width of each recess is the same as the circumferential width of each land. As such, recess 54A is circumferentially spaced from recess 54B by the circumferential width of recess 54A. Considered another way the circumferential pitch between recesses 54A and 54B is equivalent to twice the circumferential width of recess 54A. Since all recesses and lands are identical the spatial relationship between adjacent recess is also the same as the spatial relationship between recesses 54A and 54B.

Springs 32A, 32B, 32C, 32D, 32E, 32F, 32G and 32H are helical compression springs. The output element 34 includes a cylindrical portion 60 having a rim 61 at one end. The cylindrical portion as a central hole 62 and a series of circumferentially spaced pockets 63A, 63B, 63C, 63D, 63E, 63F, 63G and 63H.

The brake assembly also includes washer 70, circlip 71, return spring 72, return plate 73, bushes 74 and 75, and housing 76.

Figure 1:
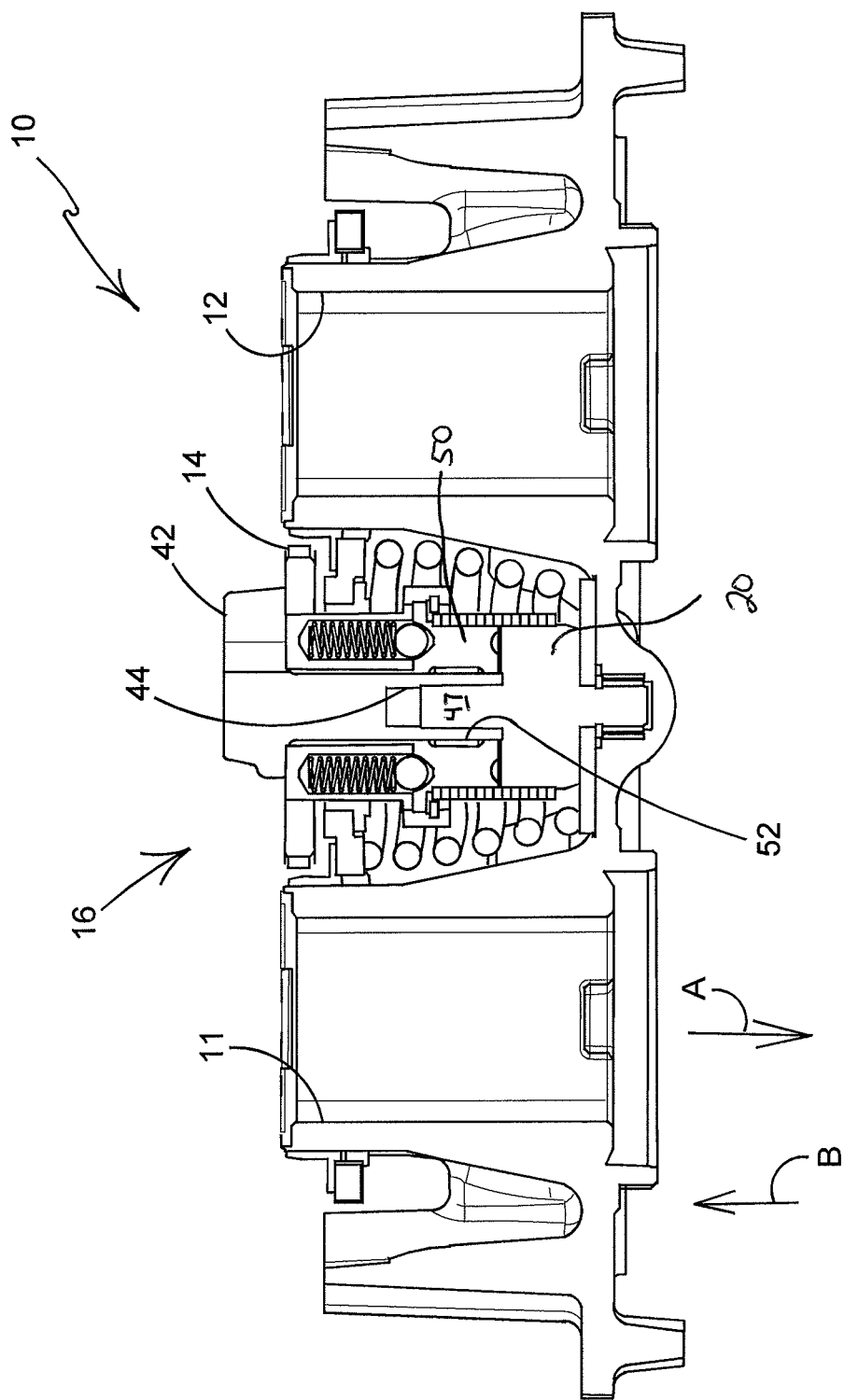
FIG. 1 is a section view of a brake adjuster mechanism according to the present invention.

The components are assembled as best seen in FIG. 1.

The first spigot 47 is a press fit in cylindrical recess 44. As such, the input shaft 18 and the drum 20 are rotationally fast with each other.

A lower portion (when viewing FIG. 1) of wrap spring 22 is positioned around and in contact with the cylindrical portion 46, and an upper portion of wrap spring 22 (when viewing FIG. 1) is positioned around and in contact with the cylindrical portion 50.

In a first position the ball bearings 30A-H sit partially in recesses 54A-H respectively. The ball bearings 30A-H also sit partially within pockets 63A-H respectively. Springs 32A-H sit in each pocket 63A-H respectively and biases its associated ball bearing 30A-H downwardly when viewing FIG. 1.

The adjuster gear 14 is a press fit on the upper part of the cylindrical portion 60. As such the adjuster gear 14 and output element 34 are rotationally fast relative to each other.

The rim 51 of the input element 28 sits in a recess in the rim 61. The rim 51 is retained within the recess of rim 61 of the output element 34 by the circlip 24 which engages a groove on the inside of rim 61. Positioned between the top of circlip 24 and the bottom of rim 51 is friction washer 26. As shown in FIG. 1, springs 32A-H are all under compression, and hence circlip 24 prevents the input element separating from the output element. Additionally, the spring force causes the friction washer 26 to be clamped between the circlip 24 and the rim 51 of the input element 28 (thereby defining a friction device 27). Because circlip 24 is fixed in a groove in the output element 34, the clamping action of the springs on the friction washer generates a rotational friction force between the input element 28 and the output element 34, the purpose of which will be described further below.

The return spring 72 is positioned generally around the one-way clutch 36 and torque limiting clutch 38. One end of return spring 72 engages washer 70 which is held in place by circlip 71 engaging a groove on the second spigot 48. The opposite end of return spring 72 engages the underside of return plate 73. As shown in FIG. 1 return spring 72 is under compression.

The second spigot 48 is supported in a bearing in housing 76.

Operation of the brake assembly is as follows:

An actuator mechanism (not shown), but which is the equivalent of the actuator mechanism shown in EP1064478 or EP1066478, is operated to slide the pistons in their associated bores 11 and 12 in the direction of arrow A. The piston gears engage the top side (when viewing FIG. 1) of bushes 74 and 75 to move them in the direction of arrow A which in turn pushes the return plate 73 in the direction of arrow A, thereby further compressing the return spring 72. When the brakes are released, the force acting on the pistons to move them in the direction of arrow A is removed and hence the return spring 72 pushes the return plate 73, and hence the pistons in the direction of arrow B, thereby allowing the brake pads to return to a rest position as the pads disengage from the disc.

The actuator mechanism includes a ball (not shown) which sits between tines 42 and 43. The ball diameter is smaller than the distance between tines 42 and 43, thereby creating a predetermined amount of backlash. In a rest position (non actuated position) the ball engages tine 42. When the actuator mechanism is operated the ball disengages tine 42 and engages tine 43. Continued movement of the ball causes tine 43 to rotate the input shaft 18 (and hence the drum 20) in a clockwise direction (see arrow C in FIG. 2) when viewed from above (i.e. when viewed in the direction of arrow D).

The coils of wrap spring 22 are orientated such that the clockwise rotation in the direction of arrow C of the drum 20 causes clockwise rotation of the wrap spring itself, which in turn causes clockwise rotation of the input element 28.

Depending upon whether or not adjustment is required dictates the sequence of events that occurs.

When the brake is applied and no adjustment is necessary the brake pads will engage the disc relatively early on in the actuator movement and the compressive load in the piston will increase. Because the compressive load in the piston has increased then the torque required to rotate the piston gear will correspondingly increase, in particular it will increase to a level above that which the torque limiting clutch can generate.

As best seen in the developed view shown in FIG. 4, the above mentioned clockwise rotation of the input element 28 as shown by arrow C of FIG. 2 equates to movement of input element 28 as shown in FIG. 4 in the direction of arrow C of FIG. 4. Under the current circumstances torque required to rotate the piston gears (and hence the torque required to rotate the adjuster gear 14 and output element 34) is above that at which the torque limiting clutch 38 can produce (i.e. it is above the limiting torque of the torque limiting clutch). As such, the output element 34 remains stationary, the input element 28 moves to the left (in the direction of arrow C) when viewing FIG. 4 and hence the springs 32A-H are all compressed slightly as the ball bearings 38A-H are forced out of their associated recesses 54A-H. The balls will then sit on the adjacent lands, thus ball 30A will sit on land 55A, ball 30B will sit on land 55B etc. (see FIG. 5).

Significantly, when the brake is released the actuator ball disengages from tine 43 and then engages and moves tine 42 such that the input shaft 18 rotates in a counter-clockwise direction when viewed in the direction of arrow D. This causes the drum 20 to also rotate in a counter-clockwise direction. However, because the coils of wrap spring 22 are orientated as described above, the one way clutch 36 is configured such that counter-clockwise rotation of the drum 20 will not drive the input element in a counter-clockwise direction. Furthermore, as described above, the springs 32A-H cause the friction washer 26 to be clamped between circlip 24 (retained in groove of the output element 34) and rim 51 (of the input element 28). As such, upon release of the brake the balls 30A-H remain upon the associated lands 55A-H and do not return to their associated pockets 54A-H because the friction device 27, i.e. the friction washer, holds the input element 28 in the position shown in FIG. 5 relative to the output element 34.

Upon the next brake actuation, the input shaft 18 is driven in a clockwise direction which in turn drives the input element 28 and wrap spring 22 in a clockwise direction. This causes the input element 28 to move in the direction of arrow C of FIG. 5. Since no adjustment is required the output element 34 remains stationary as shown in FIG. 5 and the recess 54B moves under ball 30A whereupon ball 30A is biased into recess 54B by spring 32A. Upon release of the brake, ball 30A will remain in recess 54B.

The next brake application will cause ball 30A to ride up land 55B and upon brake release ball 30A will remain on land 55B.

The next brake application will cause recess 54C to move under ball 30A whereupon ball 30A will be biased into recess 54C by spring 32A.

As will be appreciated, when no adjustment is required, a series of brake applications causes the input element 28 to progressively rotate in a clockwise direction. Significantly, each ball will progressively move to an adjacent recess. In particular each ball does not immediately return to its original recess, rather it progresses around all the other recesses.

As will be appreciated, the torque required to move the ball out of its associated recess and onto the land is higher than the torque required to move the ball from the land to the next recess. In other words, the torque required to move the input element 28 from the FIG. 4 position to the FIG. 5 position is significantly more than the torque required to move the input element from the FIG. 5 position to the FIG. 6 position. Such an arrangement significantly reduces wear of the components since, in this example, on every second brake application, the torque generated by the torque limiting clutch is significantly lower and hence the associated wear is significantly lower.

In summary, the inventive method as applied to the present embodiment is to allow the ball to sit on and remain on a land positioned between two recesses when the brake is released. Because the torque required to move the ball from the land to the next adjacent pocket is less than the torque required to move the ball from the pocket to the adjacent land, then less wear will take place on every second brake operation, and consequently overall, less wear will occur as the brake is used.

For ease of explanation, the movement of the input element 28 relative to the output element 34 as the brake is successively applied and released as described above has assumed that upon each brake application the input element rotates by an amount equal to half the circumferential pitch between each recess. In practice the amount the input element rotates relative to the output element is dependent upon the amount of adjustment required and also upon how hard the brake is applied. When adjustment is required, the output element moves more than when no adjustment is required, as will be further described below. When the brakes are applied lightly the input element moves less relative to the output element than when the brakes are applied hard. Thus, a first light brake application may move ball 30A out of pocket 54A onto the first part of land 55A, and a second light brake application may move ball 30A from the first part of land 55A to a second part of land 55A. Alternatively, an extremely hard brake application may move ball 30A from pocket 54A to pocket 54B. However, it will be appreciated that throughout the life of the brake ball 30A will spend a significant amount of time on lands 50A to 50H and when positioned on any one of these lands the wear on the adjuster mechanism when the brake is next applied will be significantly less than if bore 30A was positioned in one of the recesses 54A-H.

When the brake is applied and adjustment is required, the brake pads will engage the disc relatively late on in the actuation movement. Thus, when the input element 28 is rotated in the direction of arrow C, and the ball bearings 30A-H are in the recesses 54A-H, the input element will cause the output element to rotate in the direction of arrow C until such time as the compressive load on the piston increases to a level such that the torque required to rotate the piston gear increases above the limiting torque of the torque limiting clutch. At this stage the torque limiting clutch will "slip," i.e. the balls 30A-H will move out of the recesses 54A-H and onto the lands 55A-H. Note that if, during a subsequent brake application, adjustment is required while the balls 34A-H are positioned on lands 55A-H, then because the torque limiting clutch can only generate a relatively low torque (and in some embodiment a zero torque) when in this position, then adjustment will not take place on that brake actuation since the torque required to rotate the piston gears will always exceed the torque available from the torque limiting clutch. However, the balls will subsequently move into the recesses, and at that stage the subsequent brake application will cause brake adjustment.

Figure 7:
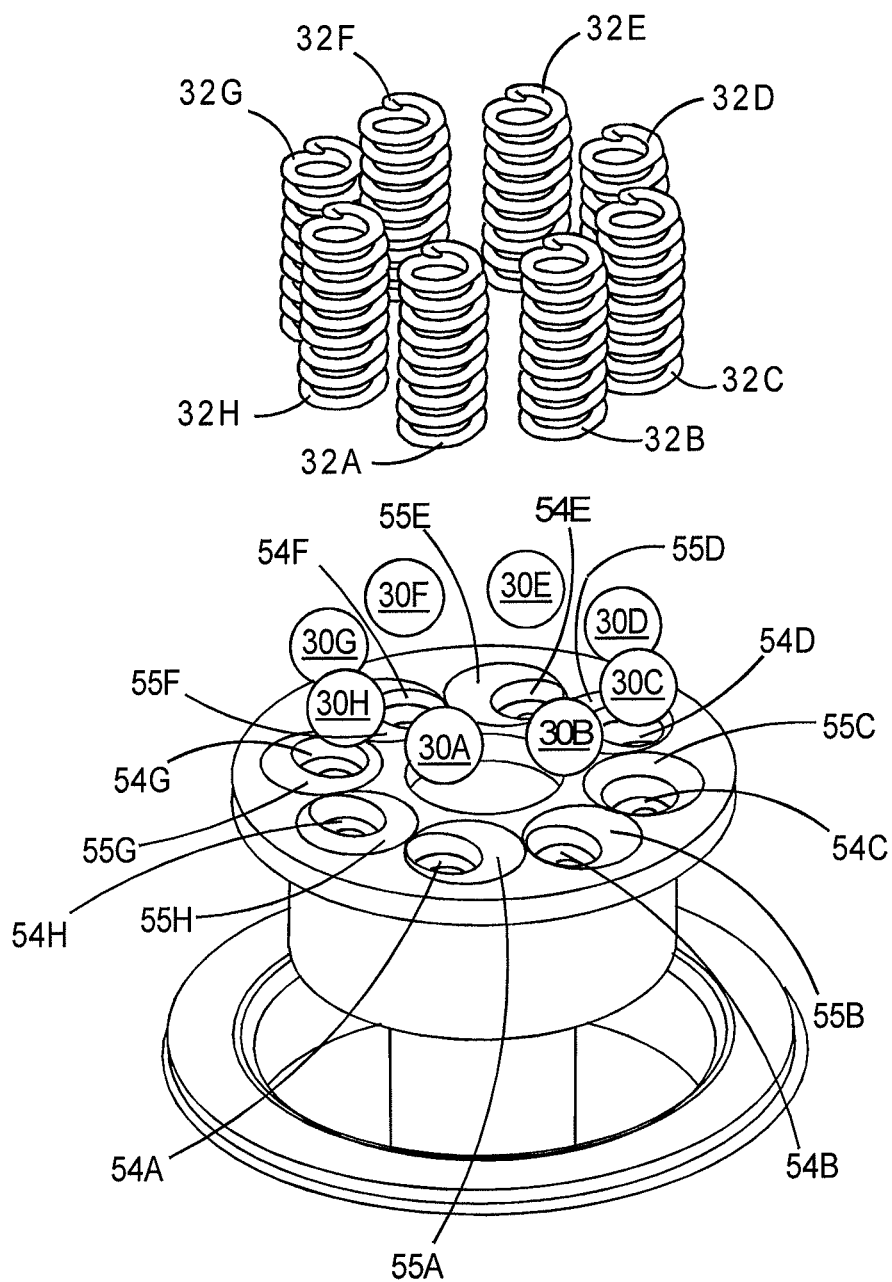
FIG. 7 is an enlarged view of part of FIG. 3.
Figure 8:
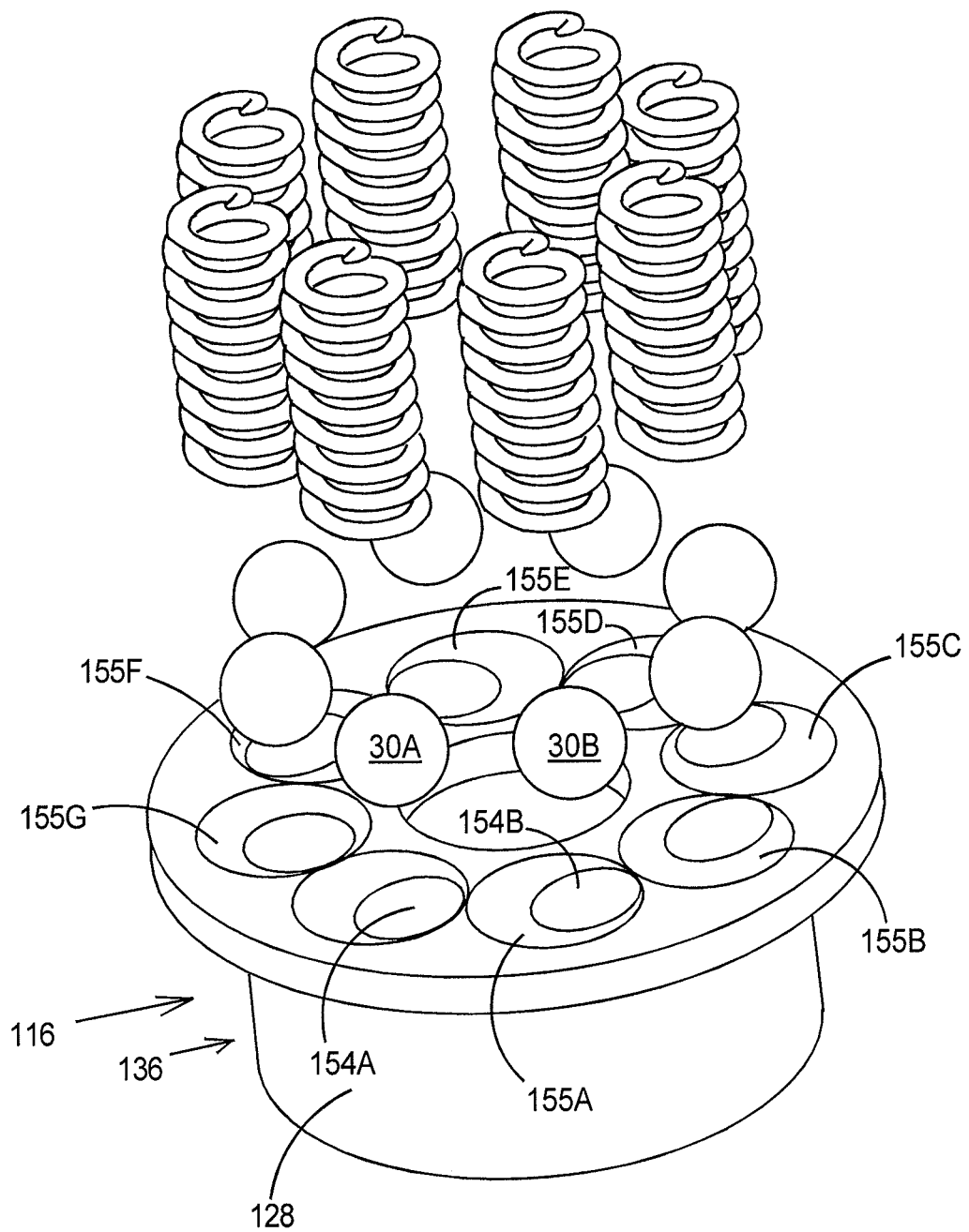
FIG. 8 is a view of part of a second embodiment of a brake adjuster mechanism according to the present invention.

As best seen in FIG. 7, each land is crescent shaped in plan view, and as best seen in FIG. 4 each land is ramped at an angle which tends to slightly increase the limiting torque as the balls move from one end of the land to the other, i.e. the land is angled upwardly towards the second recess. In further embodiments, the recesses 54 could be generated in a flat surface, thereby creating a flat (i.e. zero angled) land between adjacent recesses. In further embodiments, each land could be ramped at an angle in the opposite sense to that shown in FIGS. 7 and 4. In other words the ramp angle would tend to slightly decrease the limiting torque as the balls move from one end of the land to the other, i.e. the land is angled downwardly towards the second recess. Such a ramp arrangement can be seen in FIG. 8. Compare and contrast the crescent shaped lands 155A and 155B of FIG. 8 with the equivalent lands 55A and 55B of FIG. 7. Adjuster mechanism 116 shown in FIG. 8 is identical to adjuster mechanism 16 apart from input element 128. As indicated above, the only difference between input element 128 and input element 28 is the lands 155A to 155G. Note operation of the adjuster mechanism 116 is identical to operation of adjuster mechanism 16, and in particular the equivalent components rotate in the same direction.

Consideration of FIGS. 7 and 4 shows that, for example, during operation, with ball 30A initially in recess 54A subsequent brake applications will cause the ball to move onto the lower part of land 55A and then roll up the land to a higher part of the land and then subsequently fall into recess 54B. This can be contrasted with how ball bearing 30A of adjuster mechanism 116 moves. Initially, ball 30A will be positioned in recess 154A and during subsequent brake operations will move out of the recess onto the top portion of land 155A and will then roll down the land to a lower portion of land 155A whereupon it will then fall into recess 154B. Under certain circumstances arranging the land such that the limiting torque decreases as the ball bearing progresses from one recess to the other can be advantageous since certain types of one-way clutches, such as wrap spring one-way clutches generate a relatively small reverse torque when the brake is released. By arranging the ramps at the angle shown in FIG. 8, this relatively small reverse torque when the brake is released is countered by the fact that limiting torque of the one-way clutch 136 tends to slightly increase when this clutch is driven in reverse. Balancing the relatively small reverse torque of the one way clutch against the ramp angle means that the friction required to be generated by the friction device can be less, and accordingly, the friction device can be made smaller and or lighter and or more cheaply.

In further embodiments, the lands could be in the form of arcuate grooves connecting adjacent recesses. The arcuate groove could be angled upwardly, or downwardly, or could be level. Preferably the circumferential width of the land is greater than the width (in this case diameter) of the ball bearing. Under these circumstances, throughout the life of the brake, the ball bearings 30A-H will spend at least 50% of their time on a land, thereby at least halving the wear in the adjuster mechanism when compared to a system where torque limiting clutch balls are always positioned in a recess when the brakes are off.

As will be appreciated, the limiting torque of the torque limiting clutch is defined by the geometry of the recesses and lands and ball bearings, and in particular the bias force created by the springs 32. The limiting torque of the torque limiting clutch is independent of the return spring 72. As such springs 32 can be tuned to provide the correct limiting torque for the torque limiting clutch without affecting the force applied to the return plate 73, and similarly the return spring 72 can be tuned to apply a correct force to return plate 73 without affecting the limiting torque of the torque limiting clutch. The friction generated by the friction device 27, i.e. the friction generated by the friction washer 26 need only be sufficient to hold the output element 34 in a fixed position relative to the input element 28 when the ball bearings are positioned on the lands. This torque can be significantly lower than the limiting torque on the torque limiting clutch, and as such, the additional small torque generated by the friction washer 26 will not significantly add to wear of the adjuster mechanism.

Figure 9:
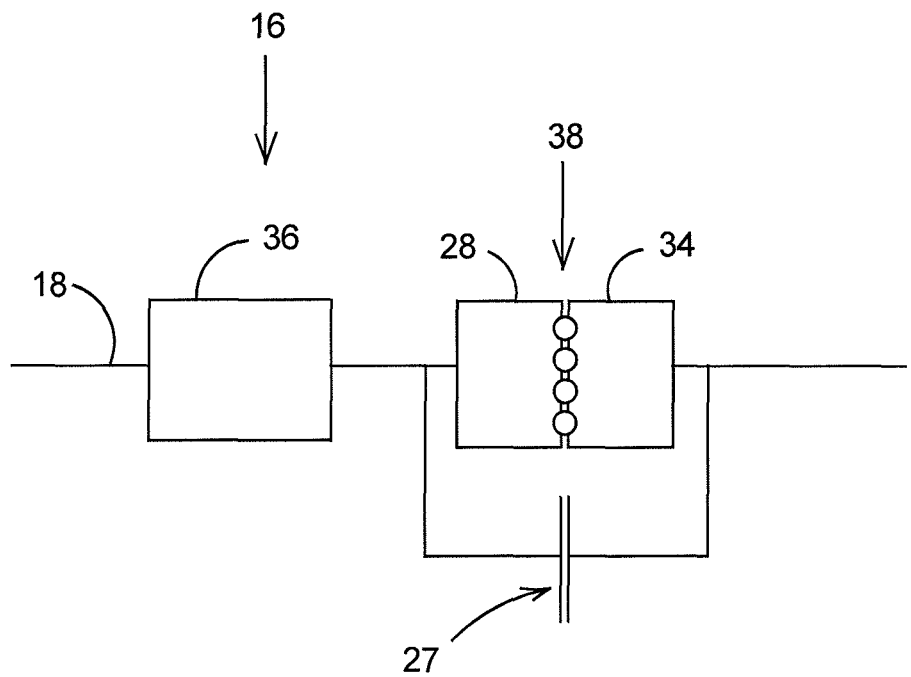
FIG. 9 is a schematic view of FIG. 1.

FIG. 9 shows a schematic view of the adjuster mechanism 16. As will be appreciated the one way clutch 36 is connected in series with the torque limiting clutch 38. The friction device 27 is connected in parallel with the torque limiting clutch 38, i.e. one side of the friction device 27 is connected to one side (input element 28) of the torque limiting clutch, and the other side of the friction device 27 is coupled to the other side (output element 34) of the torque limiting clutch.

One way clutches define a clutching mode of operation when torque is applied to the input element and this torque is transmitted to the output element. One way clutches also define a declutching mode of operation where torque is applied in opposite sense to the input element and this torque is substantially not transmitted to the output element. As mentioned above, in this example the one way clutch 36 includes a wrap spring. Such one way clutches can generate a high torque in the driving direction (i.e. in the one direction in which the clutch is engaged) when operating in the clutching mode of operation but they also generate a relatively low torque when being driven in the opposite "free wheeling" direction, i.e. when operating in the declutching mode of operation. In order for the friction device 27 to hold the output element 34 in a fixed position relative to the input element 28 when the ball bearings are positioned on the lands, the friction torque generated by the friction device 27 must be greater than the reverse torque (or free wheeling torque) generated by the one way clutch 36. In other words the torque seen across the torque limiting clutch 38 as generated by the friction device 27 must be greater than the torque as seen by the torque limiting clutch 38 generated when the one way clutch 36 operates in its free wheeling direction. In the present example the declutching torque, i.e. the torque generated when the one way clutch 36 operates in its free wheel direction, is the same as the torque as seen by the torque limiting clutch 38 (since the output element of the one way clutch 36 is directly coupled to the input element 28 of the torque limiting clutch). In further embodiments there may be a ratio change between the output element of the one way clutch and the input element of the torque limiting clutch and as such the declutching torque as seen by the input element will be different from the actual declutching torque. As will be appreciated, provided the declutching torque as seen by the torque limiting clutch is less than the torque across the torque limiting clutch generated by the friction device then the one way clutch will operate in its declutching mode of operation in preference to the input element 28 and output element 34 of the torque limiting clutch rotating relative to each other, and hence the projections will remain on the land when the one way clutch operates in its declutching mode of operation.

In the embodiments described above, the one way clutch 36 is connected in series with the torque limiting clutch 38. In the examples above, the input shaft is connected to the torque limiting clutch via the one-way clutch. In further embodiments the operational position of the one-way clutch and the torque-limiting clutch can be reversed, in other words the input shaft can be connected to the one-way clutch via the torque limiting clutch.

Figure 10:
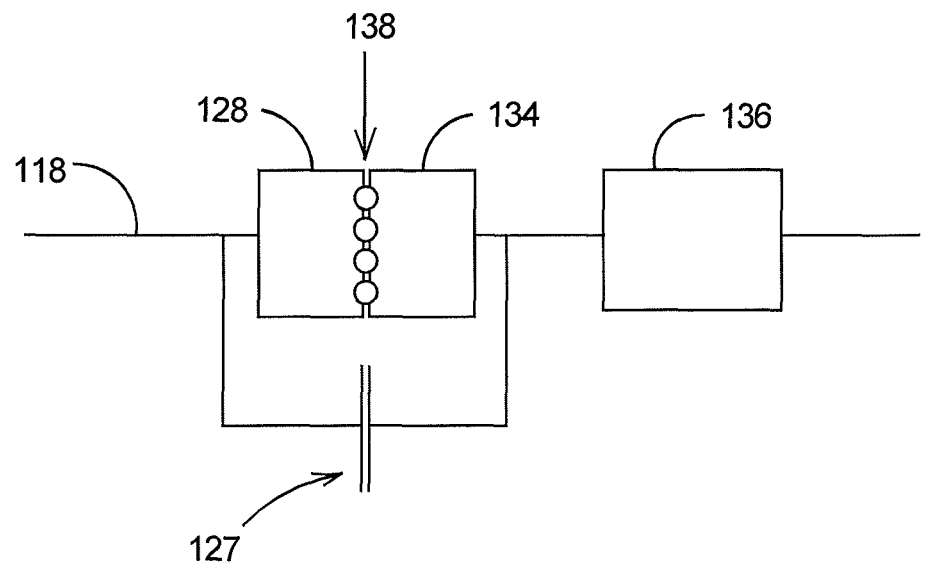
FIG. 10 is a schematic view of a further brake adjuster mechanism according to the present invention.

Such an arrangement is shown in FIG. 10 which shows an input shaft 118, a torque limiting clutch 138 having an input element 128 and an output 134, a friction device 127, and a one way clutch 136. In this case the input shaft 118 is common with the input element 128, i.e. they are rotationally fast.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A brake adjuster mechanism including:
   an input shaft;
   a one-way clutch;
   a torque limiting clutch,
   the input shaft being coupled to an input element of the torque limiting clutch, and
   the one-way clutch being coupled to the torque limiting clutch;
   wherein the torque limiting clutch further includes an output element and a coupling portion, the coupling portion including a projection for selectively rotationally coupling said input element and said output element, one of said input element and output element including a first recess circumferentially spaced from a second recess,
   wherein the projection is selectively biased into said first recess and said second recess; and
   wherein the input element is frictionally coupled by a friction device to said output element to resist rotation of the input element relative to the output element.

2. The brake adjuster mechanism as defined in claim 1 wherein the coupling portion includes a ball, and wherein a portion of the ball defines the projection.

3. The brake adjuster mechanism as defined in claim 1 including a bias member to selectively bias the projection into said first recess and said second recess, said bias member acting to generate a friction force in said friction device.

4. The brake adjuster mechanism as defined in claim 1 wherein the friction device includes a friction element operably clamped between said input element and said output element.

5. The brake adjuster mechanism as defined in claim 1 in which the input shaft is coupled to the input element of the torque limiting clutch via the one-way clutch.

6. The brake adjuster mechanism as defined in claim 5 wherein the input element forms part of the one-way clutch, and wherein the input element is engaged by a wrap spring of the one-way clutch.

7. The brake adjuster mechanism as defined in claim 1 in which the input shaft is coupled to the one-way clutch via the torque limiting clutch, and wherein the input element forms part of the input shaft.

8. The brake adjuster mechanism as defined in claim 7 in which the output element is engaged by a wrap spring of the one-way clutch.

9. The brake adjuster mechanism as defined in claim 1 wherein the first recess is circumferentially spaced from the second recess by a land angled downwardly towards the second recess.

10. The brake adjuster mechanism as defined in claim 1 wherein the first recess is circumferentially spaced from the second recess by a land angled upwardly towards the second recess.

11. The brake adjuster mechanism as defined in claim 1 in which the one-way clutch defines a clutching mode of operation and a declutching mode of operation, and further defines a declutching torque when operating in the declutching mode of operation and the declutching torque as seen by the torque limiting clutch is less than the torque across the torque limiting clutch generated by the friction device.

12. A method of operating a brake having a brake adjuster mechanism that includes:
an input shaft,
a one-way clutch, and
a torque limiting clutch,
the input shaft being coupled to an input element of the torque limiting clutch,
the one-way clutch being coupled to the torque limiting clutch,
the torque limiting clutch further including an output element and a coupling portion, the coupling portion including a projection for selectively rotationally coupling the input element and the output element, one of the input element and output element including a first recess circumferentially spaced from a second recess,
the projection being selectively biased into the first recess and said second recess,
the brake adjuster mechanism including a land between the first recess and second recess; and
wherein the method includes the steps of:
positioning the projection in the first recess,
then applying the brake so as to rotate the input element relative to the output element thereby removing the projection from said first recess and positioning the projection on the land,
then releasing the brake whilst ensuring the projection remains on the land, and
then applying the brake whilst the projection is on the land so as to rotate the input element relative to the output element thereby moving the projection from the land into the second recess.

13. The method of operating a brake as defined in claim 12 wherein said first recess is circumferentially spaced from said second recess by at least a circumferential width of said first recess.

14. The method of operating a brake as defined in claim 12 wherein the first recess is circumferentially spaced from the second recess by a land angled downwardly towards the second recess.

* * * * *